United States Patent [19]

Hino et al.

[11] 4,303,139
[45] Dec. 1, 1981

[54] ELECTRONIC WEIGHING APPARATUS

[75] Inventors: Masamichi Hino, Suita; Hiroshi Nishikawa, Osaka, both of Japan

[73] Assignee: Kubota Ltd., Osaka, Japan

[21] Appl. No.: 80,399

[22] Filed: Oct. 1, 1979

[51] Int. Cl.³ .............................................. G01G 3/14
[52] U.S. Cl. ..................... 177/210 FP; 177/DIG. 3; 177/DIG. 6
[58] Field of Search ........... 177/165, 210 FP, DIG. 6, 177/DIG. 3, 177, 178

[56] References Cited

U.S. PATENT DOCUMENTS

| | | | |
|---|---|---|---|
| 3,547,212 | 12/1970 | Grusin | 177/178 |
| 3,648,792 | 3/1972 | Uyama et al. | 177/210 FP |
| 3,853,191 | 12/1974 | Yamagiwa | 177/DIG. 3 |
| 4,082,153 | 4/1978 | Provi | 177/DIG. 3 |
| 4,102,421 | 7/1978 | Ozaki et al. | 177/DIG. 6 |
| 4,113,039 | 9/1978 | Ozaki et al. | 177/DIG. 6 |

FOREIGN PATENT DOCUMENTS

| | | | |
|---|---|---|---|
| 2220096 | 11/1973 | Fed. Rep. of Germany | 177/DIG. 6 |
| 2235359 | 2/1975 | France | 177/DIG. 6 |

*Primary Examiner*—George H. Miller, Jr.
*Attorney, Agent, or Firm*—W. G. Fasse; D. F. Gould

[57] ABSTRACT

An electronic weighing apparatus comprises a slit plate provided to be displaceable in association with the weight of an article being placed on a weighing pan. A photosensitive device is provided in the vicinity of the split plate for generating a train of pulses responsive to the slits in association with the displacement of the slit plate. The slits are provided on the slit plate such that the pulses are obtained from the photosensitive device only if and when the amount of displacement exceeds that corresponding to a predetermined weight value. The slit plate is further provided with a magnetic shield plate at the position before the photosensitive device detects the slits for the first time when the slit plate is displaced by virtue of an article. A permanent magnet and a reed switch are provided to be faced to each other through the slit plate at a mechanical zero point position, such that the reed switch is turned on if and when the slit plate is displaced and the magnetic shield plate is removed from the mechanical zero point position, whereby various components of the electronic weighing apparatus are energized by a battery. The pulse train obtained from the photosensitive device is counted by an up/down counter, which is initially loaded with the data associated with the above described predetermined weight value when the reed switch is turned on. Accordingly, the up/down counter starts a count operation of the pulse train, starting from the above described initial count value associated with the above described predetermined weight value.

23 Claims, 12 Drawing Figures

A. OUTPUT OF 27a
B. OUTPUT OF 27b
C. OUTPUT OF 451a
D. OUTPUT OF 451b
E. OUTPUT OF 455a
F. OUTPUT OF 455b

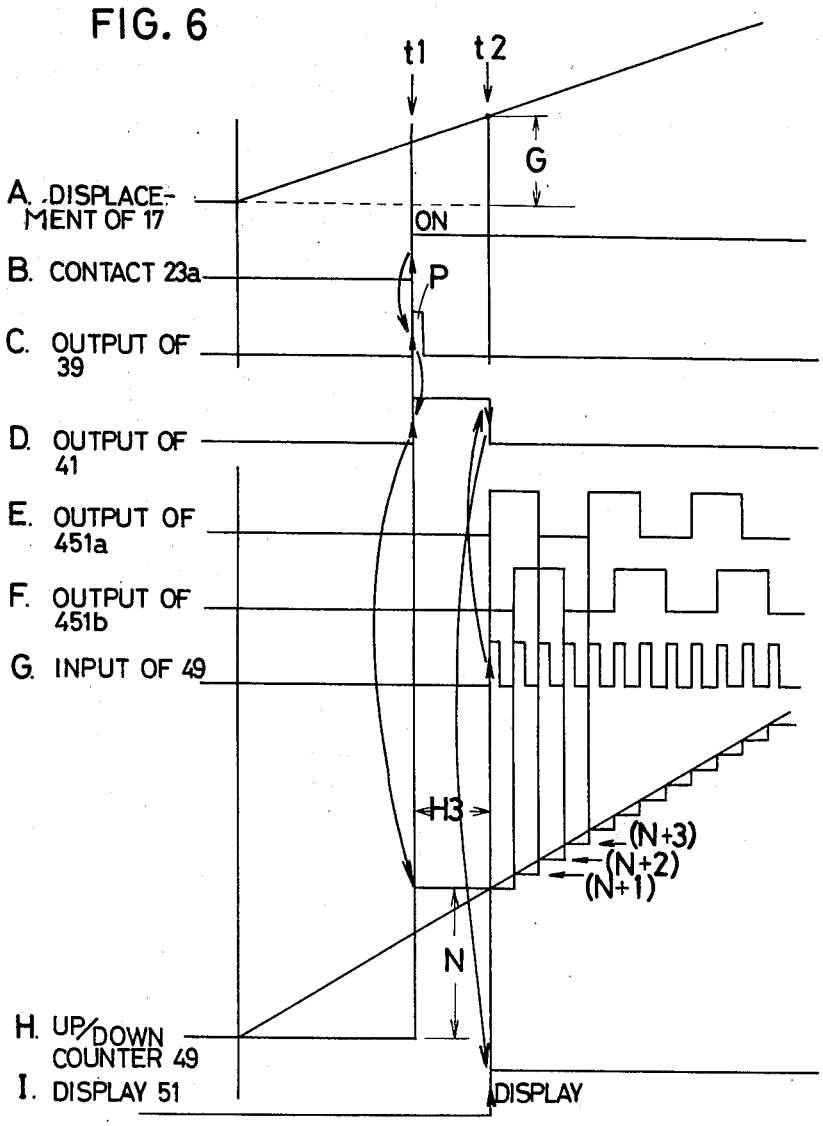

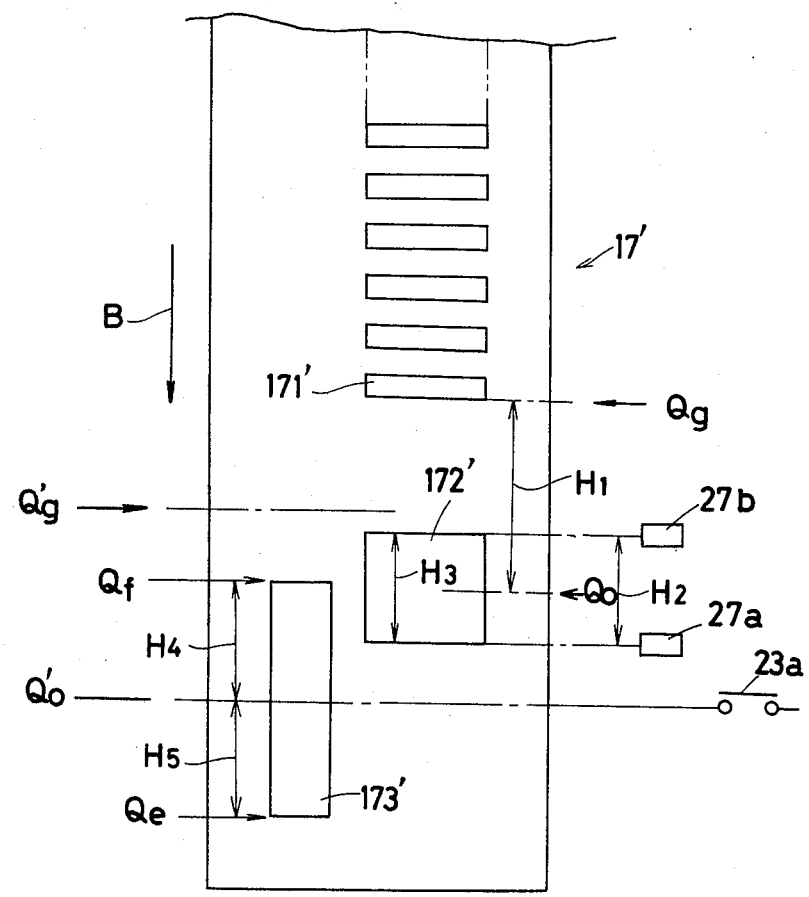
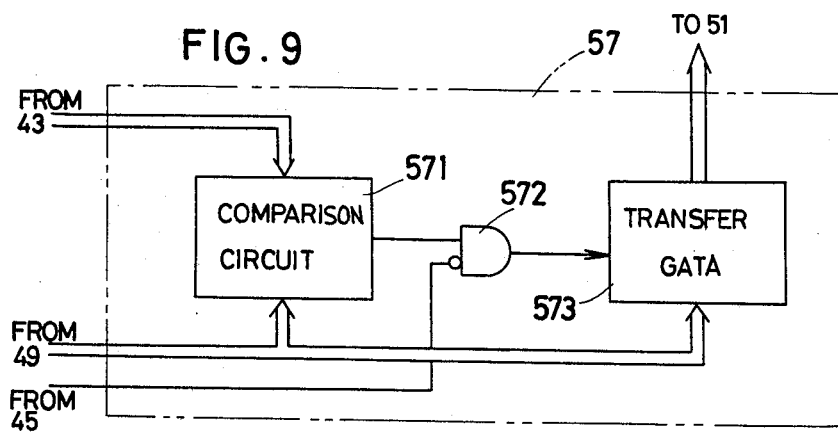

ELECTRONIC WEIGHING APPARATUS

BACKGROUND OF THE INVENTION

1. Field of the Invention

The present invention relates to an electronic weighing apparatus. More specifically, the present invention relates to an electronic weighing apparatus for converting a displacement amount of a displacement plate caused by the weight of an article into a train of pulses, counting the number of pulses for generating a digital value of the weight of the article, and displaying the weight value in a digital manner.

2. Description of the Prior Art

Of late, an electric or electronic weighing apparatus for weighing the weight of a human body and for displaying the weight value in a digital manner has been proposed and put into practical use in place of a conventional mechanical body weight weighing apparatus. Such electronic weighing apparatus requires a power source such as a battery to engergize various electronic circuits and a digital display. Although an electronic weighing apparatus for other applications may be energized by a commercial alternating current power supply line, it is most desired that a body weight weighing apparatus employs a battery as a power supply from the standpoint of safety, in consideration of a possibility that such body weight weighing apparatus is often used in a bathroom of a relatively high humidity. It is required that such electronic weighing apparatus using a battery is energized with the least possible power consumption, whereby measurement of a constant precision is ensured for a longer period of time. To that end, it has been a common practice that such an electronic weighing apparatus using a battery as a power supply is structured to comprise a human operable switch, such as a foot switch, so that the switch is turned on before measurement and is turned off after measurement. However, such operation of a human operable switch before and after measurement is tiresome. In order to eliminate such tiresomeness, therefore, one might think of an alternative approach of providing a limit switch, so that the same is turned on only if and when a human stands on an electronic weighing apparatus and is turned off when he gets off. On the other hand, in case of such an electronic weighing apparatus structured to generate a train of pulses in association with a displacement of a displacement plate and to count the number of pulses to provide the weight value data, it is required that a power supply has been turned on at least before the start of a weighing operation. Nevertheless, in the case where a limit switch is employed for energization responsive to a load, it is extremely difficult or hardly possible to make the timing of the start of a weighing operation coincide with the timing when the limit switch is turned on, with the result that an accurate weighing operation is exremely difficult or is hardly possible. Even if an electronic weighing apparatus is implemented using such a limit switch, it is required to use a switch mechanism of a very high precision, which is usually expensive. Nevertheless, it is extremely difficult or hardly possible to ensure for a long period of time that the apparatus operates such that the start of a weighing operation and the start of the power supply occur at the same time.

SUMMARY OF THE INVENTION

Briefly described, the present invention comprises an electronic weighing apparatus, comprising displacement means responsive to a weight value of an article for causing a displacement in association with the weight value, pulse generating means responsive to the displacement of the displacement means for generating pulses, the pulse generating means being structured to initiate generation of the pulses if and when the displacement of the displacement means exceeds that corresponding to a predetermined weight value, counting means for counting the number of pulses for generating digital data associated with the displacement and thus associated with the weight value, the counting means being structured to initiate a count operation starting from an initial count value associated with the above described predetermined weight value simultaneously with initiation of generation of the pulses, and display means responsive to the count value in the counting means for displaying the weight value in a digital manner.

According to the present invention, the pulse generating means is structured to initiate generation of the pulses if and when a displacement of the displacement means exceeds that corresponding to a predetermined weight value, and the counting means is structured to initiate a counting operation at the timing when generation of the pulses is initiated, using a count value associated with the above described predetermined weight value as an initial count value. Accordingly, a counting operation in a mechanically and electrically unstable state is eliminated, thereby to ensure an accurate counting operation.

In a preferred embodiment of the present invention, switching means is provided to be operable responsive to detection of placement of an article being weighed and power supply controlling means is provided responsive to the switching means for intiating a power supply to the circuit components of the inventive elctronic weighing apparatus. Provision of such power supply controlling means achieves reduction of power consumption. Accordingly, the power supply control means responsive to placement of an article for initiating a power supply to the circuit components of the inventive electronic weighing apparatus is free from any necessity to initiate a power supply strictly at the same time as the initiation of a weighing operation and accordingly the inventive electronic weighing apparatus can be implemented using switching means operable responsive to placement of an article, which is of a simple structure and a low precision. Furthermore, alignment of the timing when a power supply is turned on responsive to placement of an article and the timing when generation of the pulses is initiated or a weighing operation is initiated can be made with extreme ease. Furthermore, when no article is placed on the inventive electronic weighing apparatus, whereby the apparatus is placed in a standby state, a power supply to the various circuit components of the weighing apparatus is assuredly interrupted, thereby to eliminate any power consumption in such state. Accordingly, even if the inventive electronic weighing apparatus is structured to be energized by a battery, a weighing operation can be performed with a constant precision maintained for a longer period of time.

In a preferred embodiment of the present invention, placement of an article is detected by detection of a displacement of the displacement means in a non-contact manner. Accordingly, means for detecting placement of an article is free from any portion in mechanical contact with the displacement means and hence the detecting means is assuredly operable.

In a further preferred embodiment of the present invention, a power supply to the circuit components is automatically interrupted after the lapse of a predetermined period of time after placement of an article is detected and a power supply is turned on. As a result, power consumption is prevented from being undesirably continued, when an undesired article is erroneously placed on the inventive electronic weighing apparatus.

Accordingly, a principal object of the present invention is to provide an improved electronic weighing apparatus.

Another object of the present invention is to provide an electronic weighing apparatus that is capable of reducing undesired power consumption.

A further object of the present invention is to provide an electronic weighing apparatus, wherein a power supply is assuredly turned on during a weighing operation and a power supply is assuredly interrupted in a standby state.

Still a further object of the present invention is to provide, an electronic weighing apparatus, wherein any necessity of strictly aligning the timing when a power supply is turned on and the timing when a weighing operation is initiated is eliminated, thereby to enable employment of an article placement detecting mechanism of a simple structure and of an inexpensive cost.

These objects and other objects, features, aspects and advantages of the present invention will become more apparent from the following detailed description when taken in conjunction with the accompanying drawings.

BRIEF DESCRIPTION OF THE DRAWINGS

FIG. 6 is a timing chart for explaining an operation of the FIG. 1 embodiment;

FIG. 8 is a view for diagrammatically showing a slit plate for use in the FIG. 7 embodiment;

FIG. 9 is a block diagram showing a display control for use in the FIG. 7 embodiment;

DESCRIPTION OF THE PREFERRED EMBODIMENTS

Figure 1:
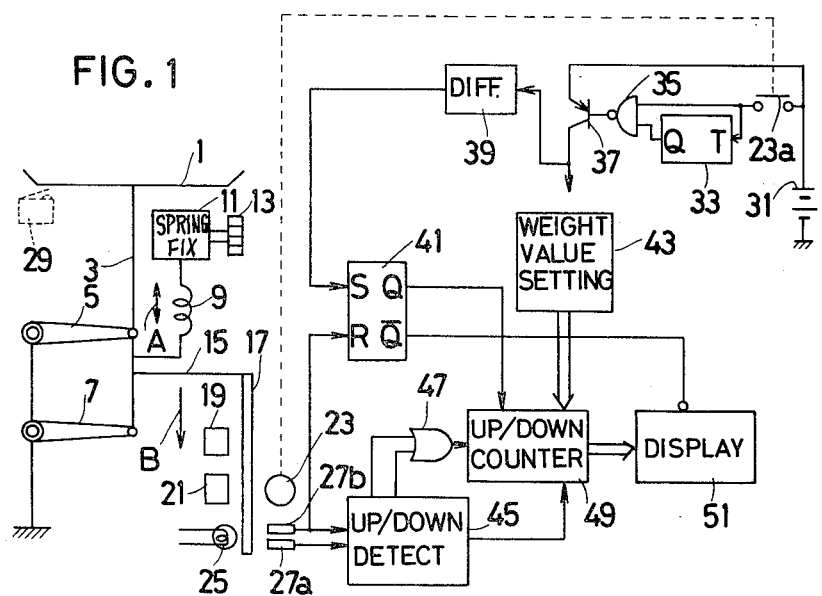
FIG. 1 is a block diagram showing an outline of one embodiment of the present invention.

FIG. 1 is a block diagram showing an outline of one embodiment of the present invention. Referring to FIG. 1, various components shown are housed within or mounted to a casing, not shown. An article placing pan 1 is provided outside of the casing and to be displaceable in the vertical direction in association with an article being placed thereon, not shown. The article placing pan 1 is coupled to links 5 and 7 through a connecting member 3, whereby the article placing pan 1 is displaceably supported by means of the links 5 and 7. The connecting member 3 is also coupled to one end of a spring 9, while the other end of the spring 9 is connected to a spring fixing portion 11. Accordingly, the spring 9 serves to attract the links 5 and 7, and thus the connecting member 3, i.e. the article placing pan 1 in the direction opposite to the downward direction (the arrow B direction). The spring fixing portion 11 is provided to be adjustably displaceable by means of a zero adjusting knob 13, so that deviation of the zero point of a slit plate 17, to be described subsequently, can be corrected by adjustment of the knob 13. The connecting member 3 is further coupled to the above described slit plate 17 by means of a connecting member 15. Accordingly, the slit plate 17 is displaced in association with a displacement of the article placing pan 1 in the arrow B direction.

Figure 2:
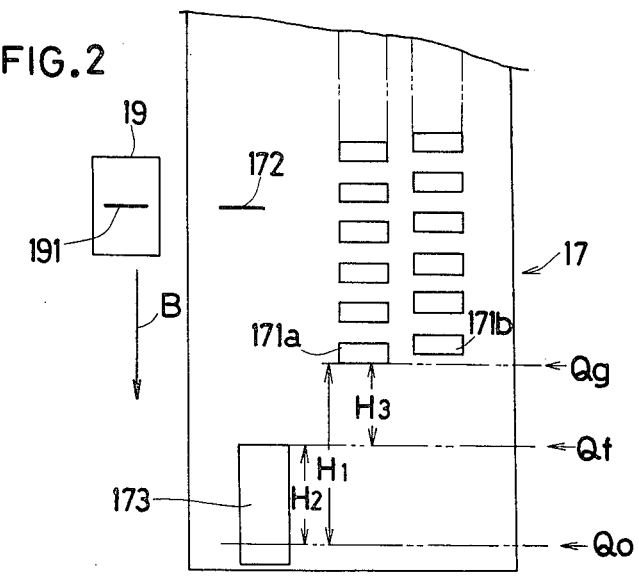
FIG. 2 is a view diagrammatically showing a slit plate for use in the FIG. 1 embodiment.

The slit plate 17 is formed of a series of slits 171a and 171b, as shown in FIG. 2. The slits 171a and the slits 171b are arranged such that both slit trains are dislocated or offset by 90 degrees in terms of the phase. The slit plate 17 is further formed of a zero point index 172. The casing, not shown, is formed of a zero point confirmation window 19 at the position where the above described zero point position index 172 can be observed when no article is placed on the article placing pan 1. The zero point confirmation window 19 is formed of a zero point position adjusting index 191. Accordingly, zero point adjustment can be made by operating the zero point adjusting knob 13, such that the spring fixing portion 11 is displaced in the arrow A direction shown in FIG. 1, in association with deviation of the zero point position index 172 of the list plate 17 from the zero point adjusting index 191 of the zero point confirmation window 19. As a result, zero point adjustment can be made to make both indexes 172 and 191 consistent with each other.

A permanent magnet 21 is provided at one side of the slit plate 17 and a reed switch 23 serving as a magnet sensitive switch is provided at the opposite side at the position faced to the permanent magnet 21. The slit plate 17 is further provided with a magnetic shield plate 173 for turning on or off the reed switch 23. An operation of the reed switch 23 will be described subsequently with reference to FIGS. 5A and 5B. A lamp 25 is provided at one side of the slit plate 17 for detecting the slits 171a and 171b in a photoelectric manner. Two photosensitive devices 27a and 27b are provided at the opposite side of the slit at the position corresponding to the lamp 25, such that the devices 27a and 27b may correspond to the slits 171a 171b, respectively. Accordingly, when the slit plate 17 is diplaced, the photosensitive devices 27a and 27b receive a light beam from the lamp 25 through the corresponding slits 171a and 171b, respectively. The output signals obtained from the photosensitive devices 27a and 27b are converted into pulse signals, to be described subsequently.

One terminal of the contact 23a of the reed switch 23 operable responsive to the permanent magnet 21 and the magnetic shield plate 173 is connected to the positive terminal of a battery 31. A negative terminal of the battery 31 is connected to the ground. The opposite terminal of the contact 23a is connected to a trigger input terminal T of a monostable multivibrator 33 and is also connected to one input terminal of a NAND gate 35. Another input of the NAND gate 35 is connected to receive the output of the monostable multivibrator 33. The output of the NAND gate 35 is applied to the base electrode of a switching transistor 37. The monostable multivibrator 33 and the NAND gate 35 are connected to be normally energerized by means of the battery 31. A power consumption of these circuits 33 and 35 is very small and, by way of an example, is as small as approximately 0.1% of the power consumption by the whole circuits in a typical apparatus employing the present invention. Thus it would be appreciated that such a power consumed by a normal supply of power to these circuits is negligible. The output of the switching transistor 37 is connected to various electric components of the electronic weighing apparatus for the purpose of selective energization. The output of the switching transistor 37 is applied to a differentiation circuit 39.

The output of the differentiation circuit 39 is applied to the set input S of flip-flop 41. The reset input R of the flip-flop 41 is connected to receive the output signal of the photosensitive device 27b (through a pulsing circuit 451b as the case may be, as to be described subsequently). The non-inverted output Q of the flip-flop 41 is applied to an up/down counter 49 and the inverted output $\overline{Q}$ of the flip-flop 41 is applied to a display control terminal of a display 51. The display 51 is enabled responsive to the signal applied to the display control terminal, i.e. the converted output $\overline{Q}$ of the flip-flop 41 is the high level, thereby to display the data obtained from the up/down counter 49.

The data corresponding to a predetermined weight value, for example 10 kg in case of a human body weight weighing apparatus, has been preset in a weight value setting circuit 43. The data associated with the above described predetermined weight value is loaded in the up/down counter 49, if and when the non-inverted output Q of the flip-flop 41 is applied as the high level to the up/down counter 49. The count input of the up/down counter 49 is connected to receive the output of the OR gate 47. The two inputs of the OR gate 47 are connected to receive the up count pulse and the down count pulse, respectively, from the up/down detecting circuit 45. The direction (the up count direction or the down count direction) detected output of the up/down detecting circuit 45 is applied to the up/down counter 49 for the purpose of rendering the up/down counter 49 in an up count mode or a down count mode.

Figure 3:
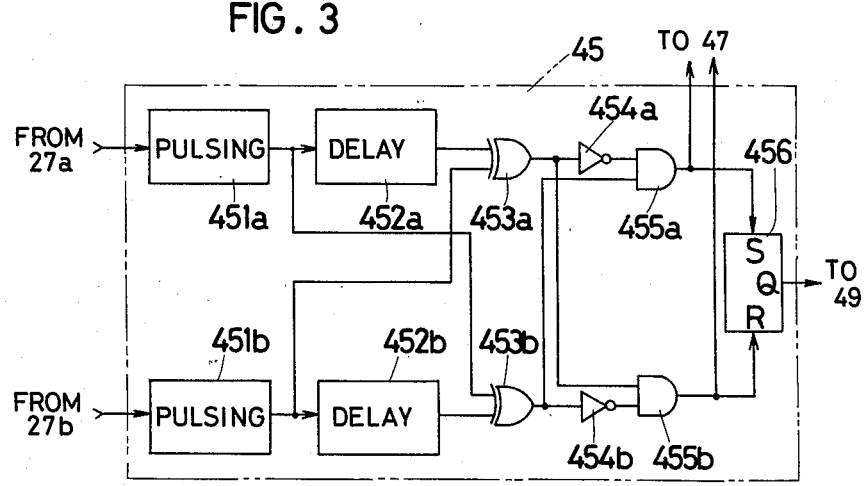
FIG. 3 is a block diagram showing in detail an up-/down detector for use in the FIG. 1 embodiment.

Referring to FIG. 3, the above described up/down detecting circuit 45 is described in detail. The output of the photosensitive device 27a and the output of the photosensitive device 27b are applied to the corresponding pulsing circuits 451a and 451b, respectively. The output pulse of the pulsing circuit 451a is applied to the input of a delay circuit 452b and one input of an exclusive OR gate 453b. The output pulse of the pulsing circuit 451b is applied to the input of a delay circuit 452b and one input of an exclusive OR gate 453a. The other input of the exclusive OR gate 453a is connected to receive a delayed pulse obtained from the delay circuit 452a. Similarly, the other input of the exclusive OR gate 453b is connected to receive the output of the delay circuit 452b. The output of the exclusive OR gate 453a is applied to one input of an AND gate 455b and, after inversion by means of an inverter 454a, to one input of an AND gate 455a.

The output of the exclusive OR gate 453b is applied to the other input of the AND gate 455a and, after inversion by means of an inverter 454b, to another input of the AND gate 455b. The outputs of the AND gates 455a and 455b are applied to the OR gate 47 as an up count pulse or a down count pulse. At the same time, the output of the AND gate 455a is applied to the set input S of the flip-flop 456 and the output of the AND gate 455b is applied to the reset input R of the flip-flop 456. The output Q of the flip-flop 456 is applied to the up/down counter 49 as a switching signal for selection of an up count mode or a down count mode.

Figure 4:
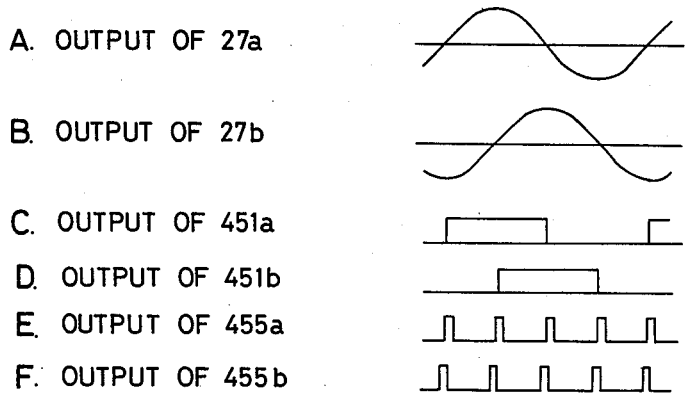
FIG. 4 is a graph showing waveforms for explanation of an operation of the FIG. 3 diagram.

Now referring to FIG. 4, an operation of the FIG. 3 up/down detecting circuit 45 will be described. If and when the slit plate 17 is displaced as shown in FIG. 2, the detected outputs as shown as A and B in FIG. 4 are obtained from the corresponding photosensitive devices 27a and 27b, respectively. The output from the photosensitive device 27a is delayed by 90° (quadrature) with respect to the output from the photosensitive device 27b. The reason is that the respective slits 171a and 171b formed in the slit plate 17 provided in front of the respective photosensitive devices 27a and 27b are offset or displaced by a pitch corresponding to 90°. It is pointed out that FIG. 4 shows a case where the slit plate 17 is displaced in the arrow B direction as shown in FIGS. 1 and 2. In case of a reversed directional displacement, the phase relation of the output signals from the photosensitive devices 27a and 27b is reversed with respect to that shown in FIG. 4. The output signal as shown as A in FIG. 4 is shaped into a pulse as shown as C in FIG. 4 by means of the pulsing circuit 451a, while the signal as shown as B in FIG. 4 is shaped into a pulse as shown as D in FIG. 4 by means of the pulsing circuit 451b. Accordingly, an up count pulse is obtained from the AND gate 455a, as shown as E in FIG. 4. In case where the displacement direction of the slit plate 17 is opposite to the arrow B direction, a down count pulse as shown as F in FIG. 4 is obtained from the AND gate 455b. In other words, if and when the slit plate 17 is displaced in the arrow B direction, the up count pulse is obtained from the AND gate 455a and the up count mode signal of the low level is applied from the flip-flop 456 to the up/down counter 49. On the other hand, if and when the slit plate 17 is displaced in the direction opposite to the arrow B direction, the down/count pulse is obtained from the AND gate 455b and the down count mode signal of the high level is applied from the flip-flop 456 to the up/down counter 49. The up/down counter 49 makes an up count operation or a down count operation of the up count pulse or the down count pulse obtained from the OR gate 47 as a function of the mode selection signal obtained from the flip-flop 456.

Figure 11:
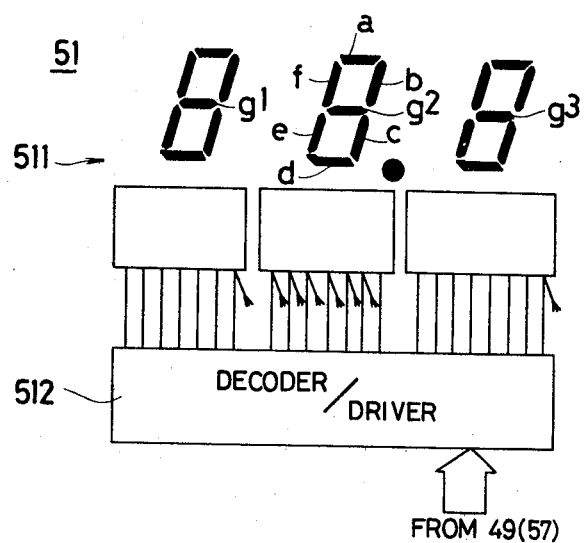
FIG. 11 is a view showing a display for use in the present invention.

Returning to FIG. 1, the count value in the up/down counter 49, i.e. the weight value associated data is applied to the display 51. Accordingly, the display 51 displays in a digital manner the weight value of an article, not shown, placed on the article placing pan 1 based on the weight value associated data, if and when the inverted output $\overline{Q}$ of the flip-flop is the high level. The display 51 comprises a display portion 511 including three digit positions, each including an arrangement of eight segments in the character shape "8", for displaying one of numerals through selective energization of the segments, as shown in FIG. 11, and a decoder/driver 512 for selectively driving the respective segments of the display portion 511.

Figure 5A:
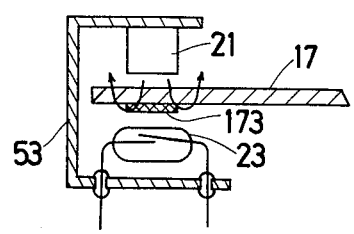
FIGS. 5A and 5B are views for explaining an operation of the reed switch for use in FIG. 1 embodiment as an example of an article placement detector.
Figure 5B:
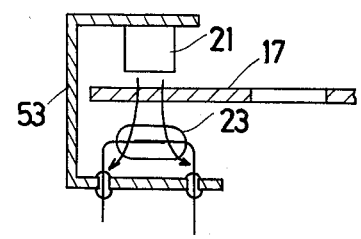

Referring to FIGS. 2, 5A and 5B, an operation of the slit plate 17 and the reed switch 23 will be described in more detail. The slit plate 17 is made of a non-magnetic material. The slit plate 17 is not formed of any slits in the region H1 from the mechanical zero point position Q0 to the position Qg of a displacement amount corresponding to the above described predetermined weight value (which is the same as the weight as preset in the weight value setting circuit 43 shown in FIG. 1), as shown in FIG. 2. More specifically, the slits 171a and 171b are formed in the slit plate 17, such that when the slit plate 17 is displaced in the arrow B direction the slits 171a and 171b are detected by the photosensitive devices 27a and 27b for the first time after the slit plate 17 is displaced from the mechanical zero point position Q0 by a displacement amount H1 corresponding to the above described predetermined weight value. It is pointed out that the slits 171a and 171b are formed to be offset by 90° in phase for the purpose of discrimination of the displacement direction of the slit plate 17.

The reed switch 23 is adapted such that the contact 23a is turned on by application of a magnetic field generated by the permanent magnet 21. On the other hand, the magnetic shield plate 173 is formed in the region H2 from the mechanical zero point Q0 of the slit plate 17 to the position Qf in front of the slit 171a, i.e. well before the position Qg representing the end of the slit 171a. The reed switch 23 and the permanent magnet 21 are provided such that the same are positioned at the mechanical zero point position Q0 of the slit plate 17 in the case where the slit plate 17 is in the initial condition, i.e. no article is placed on the article placing pan 1 (FIG. 1) and the same are fixed to the supporting portion 51 (FIGS. 5A and 5B). Accordingly, as seen in FIG. 5A, when the permanent magnet and the reed switch 23 are faced to the region H2 of the slit plate 17, i.e. the magnetic shield plate 173 is positioned between the permanent magnet 21 and the reed switch 23, no magnetic field is applied from the permanent magnet 21 to the reed switch, with the result that the reed switch 23 remains off. If and when the slit plate 17 is displaced by a displacement amount corresponding to the region H2 in the arrow B direction shown in FIG. 2, then the magnetic shield plate 173 comes not to be positioned between the permanent magnet 21 and the reed switch 23. Accordingly, as shown in FIG. 5B, a magnetic field is applied from the permanent magnet 21 to the reed switch 23, whereby the contact 23a of the reed switch 23 is turned on.

Now referring to the FIG. 6 timing chart, an operation of the FIG. 1 embodiment will be described in the following. In making a weighing operation, first of all the zero point adjusting knob 13 shown in FIG. 1 is operated, such that the zero point position index 172 and the zero point position adjusting index 191 shown in FIG. 2 coincide with each other, whereby zero adjustment is made. In such a state, no magnetic field is applied from the permanent magnet 21 to the reed switch 23 and accordingly the contact 23a of the reed switch remains off. Therefore, a power supply is not applied from the switching transistor 37 to the electric circuit components.

When an article is placed on the article placing pan 1, the article placing pan 1 and thus the slit plate 17 is displaced in the arrow B direction (A of FIG. 6). When the magnetic shield plate 173 comes to be away from the permanent magnet 21 and the reed switch 23 at the timing t1 as the slit plate 17 is displaced, the contact 23a of the reed switch 23 is turned on at the timing t1, as shown in B of FIG. 6. Accordingly, the monostable multivibrator 33 is triggered and the output Q thereof becomes the high level. Therefore, two inputs of the NAND gate 35 both become the high level and the output thereof turns to the low level. Accordingly, the switching transistor 37 is rendered conductive, whereby a power supply from the battery 31 is applied through the transistor 37 to various circuit components, such as the lamp 25, the photosensitive devices 27a and 27b, the flip-flop 41, the up/down detecting circuit 45, the OR gate 47, the up/down counter 49, the display 51 and the like. Accordingly, these circuit components are energized.

At the same time, the power supply from the switching transistor 37 is applied also to the differentiation circuit 39. Accordingly, assuming that a supply voltage obtained from the switching transistor 37 rises at the timing t1, then the differentiation circuit 39 is responsive to the rise of the supply voltage at the timing t1, thereby to provide a pulse P as shown as C in FIG. 6. Accordingly, the flip-flop 41 is set at the timing t1, whereby the non-inverted output Q rises as shown as D in FIG. 6. When the output Q of the flip-flop 41 becomes the high level, a preset load enable signal is applied to the up/down counter 49, whereby the up/down counter 49 is loaded with the data associated with the above described predetermined weight value from the predetermined weight value setting circuit 43. At that time, the non-inverted output Q of the flip-flop 41 becomes the high level, while the inverted output $\overline{Q}$ thereof becomes the low level, whereby the display 51 is disabled.

Thereafter the article placing pan 1 and thus the slit plate 17 is further displaced in the arrow B direction. Then the photosensitive device 27a comes to receive a light beam from the lamp 25 through the first slit 171a at the timing t2 shown in A of FIG. 6. Accordingly, a pulse as shown as E in FIG. 6 is obtained from the pulsing circuit 451a (FIG. 3) at the timing t2. After the phase difference of 90°, the photosensitive device 27b comes to receive a light beam from the lamp 25 through the slit 171b. Accordingly, a pulse as shown as F in FIG. 6 is obtained from the pulsing circuit 451b (FIG. 3). Accordingly, the flip-flop 41 is reset at the timing t2, whereby the inverted output $\overline{Q}$ becomes the high level. Therefore, the display 51 is controlled in an enabled state. Since the non-inverted output Q of the flip-flop 41 turns to the low level, the up/down counter 49 is brought into an up count mode. At the same time, since the slit plate 17 is being displaced in the arrow B direction as shown in FIG. 2, an up count pulse as shown as G in FIG. 6 is applied from the up/down detecting circuit 45 and thus from the OR gate 47 to the up/down counter 49 as a count input. At the same time, the flip-flop 456 (FIG. 3) of the up/down detecting circuit 45 is set, whereby the output Q thereof becomes the high level. As a result the up/down counter 49 is brought to an up count mode. Thereafter the up count pulse as shown as G in FIG. 6 is applied to the count input of the up/down counter 49 as the slit plate 17 is displaced in the arrow B direction. Accordingly, the up/down counter 49 starts an up count operation starting from the timing t2. However, since the up/down counter 49 has already been loaded with the data N associated with the above described predetermined weight value, an up count operation is made responsive to the further pulse signals such as "N+1", "N+2", "N+3", ... At that time, since the display 51 has already been enabled, the weight value associated data being applied to the display 51 from the up/down counter 49 is renewed as an up count operation is in succession made, with the result that the display 51 displays in a digital manner the weight value of the article being placed on the article placing pan 1 based on the weight value associated data thus renewed.

According to the embodiment shown, a power supply is applied to the circuit components at the timing before the first pulse is obtained after the slit plate 17 is displaced, i.e. the power supply is applied upon operation of the reed switch serving as an article detecting means in the region H1 shown in FIG. 2. Therefore, it follows that a power supply is assuredly turned on before generation of the pulse signals, i.e. before initiation of a count operation by the up/down counter 49. Accordingly, in the embodiment shown, it is not necessary to make the timing when generation of the pulse signals is initiated or a count operation by the counter 49 is initiated and the timing when a power supply is turned on coincide with each other and thus it is not necessary to precisely detect whether an article is placed on the article placing pan 1. In the embodiment shown, the time period when the slit plate 17 is displaced by the region H3 shown in FIG. 2 can be effectively used as a time period for stabilization of the operation of various circuit components. More specifically, referring to the FIG. 6 timing chart, a power supply starts being applied to various circuit components at the timing t1, whereupon a count operation by the up/down counter 49 is initiated after the lapse of a time period for displacement of the slit plate 17 for the region H3, i.e. at the timing t2. Therefore, the operation of various electric circuit components can reach a stabilized operation state from an unstable operation state of a transient phenomenon during the time period from the timing t1 to the timing t2. On the other hand, at the time point when generation of the pulse signals is initiated or a count operation is initiated, a count value of a predetermined weight value corresponding to the displacement amount of the slit plate 17 corresponding to the region H1 shown in FIG. 2 has already been loaded in the up/down counter 49. Therefore, the up/down counter 49 initiates a count operation responsive to the first pulse signal starting from the predetermined weight value associated data N, whereby erroneous weighing operation is avoided.

Meanwhile, in the embodiment shown, the location for the magnetic shield plate 173 is formed is not limited to the location specifically shown in FIG. 2 and it is sufficient to form the magnetic shield plate 173 such that the reed switch 23 is turned on after the slit plate 17 is displaced and until the first slit 171a is detected by the photosensitive device 27a. This means that the location of formation of the magnetic shield plate 173 is not critical and hence the location need not be strictly adjusted. The embodiment shown also employs an article detecting means implemented by the permanent magnet 21, the reed switch 23 and the magnetic shield plate 173. Therefore, such an article detecting means can detect placement of an article on the article placing pan 1 in non-contact with a movable portion, without any time dependent variation of the characteristic and without any unfavorable influence by environment such as an ambient temperature and the like.

Although the above described embodiment was structured such that the data associated with the above described predetermined weight value is loaded in the up/down counter 49 at the timing t1 when the contact 23a of the reed switch 23 is turned on, generally the data may be loaded in the up/down counter 49 until the timing t2 at the latest and accordingly the data may be loaded in the up/down counter 49 for the first time at the timing when the first slit 171a is detected. Alternatively, separate means may be provided for enabling the up/down counter 49 to be loaded with the data associated with the above described predetermined weight value at any time point during the time period from the timing t1 to the timing t2 shown in A of FIG. 6.

If and when the article is removed from the article placing pan 1 of the FIG. 1 embodiment, the slit plate 17 is returned to the initial state and accordingly the reed switch 23 is again turned off, whereby a power supply from the battery to the circuit components is terminated.

Now assuming that an article is kept placed on the article placing pan 1 for a long period of time, then after the lapse of a preset time period of the monostable multivibrator 33 shown in FIG. 1 a power supply from the battery to the various circuit components is automatically terminated. More specifically, at the timing t1 the monostable multivibrator 33 is triggered, whereby the output Q thereof becomes the high level at that timing. After the lapse of a predetermined time period, say fifteen minutes, of the monostable multivibrator, the output Q thereof becomes the low level. Accordingly, after the lapse of the above described predetermined time period, the output of the NAND gate 35 becomes the high level and hence the switching transistor 37 is rendered non-conductive. Accordingly, a power supply from the battery 31 through the switching transistor 37 is terminated.

The above described embodiment employed the reed switch 23 to be controlled as a function of a magnetic flux generated by the permanent magnet 21 as a switching means for controlling a power supply. It is pointed out that such a switching means was depicted to show only an example of a non-contact switch. Alternatively, however, a contact type switch also may be used as a switching means for controlling a power supply, provided that a load exerted by the contact is minor. More specifically, a micro switch or a limit switch 29 may be provided in the vicinity of the article placing pan 1 so as to be operable until after the article placing pan 1 is displaced by a given displacement amount corresponding to the above described predetermined weight value, at the latest. The contact of such switch, not shown, may be used in place of the contact 23a of the reed switch 23.

The above described predetermined weight value may be changed arbitrarily depending on the maximum weight value and the type of the weighing apparatus, and by way of an extreme example, the above described predetermined weight value may be nil. Accordingly, it would be appreciated that the above described predetermined weight value is to be interpreted in a broader sense to cover any arbitrary value.

Figure 7:
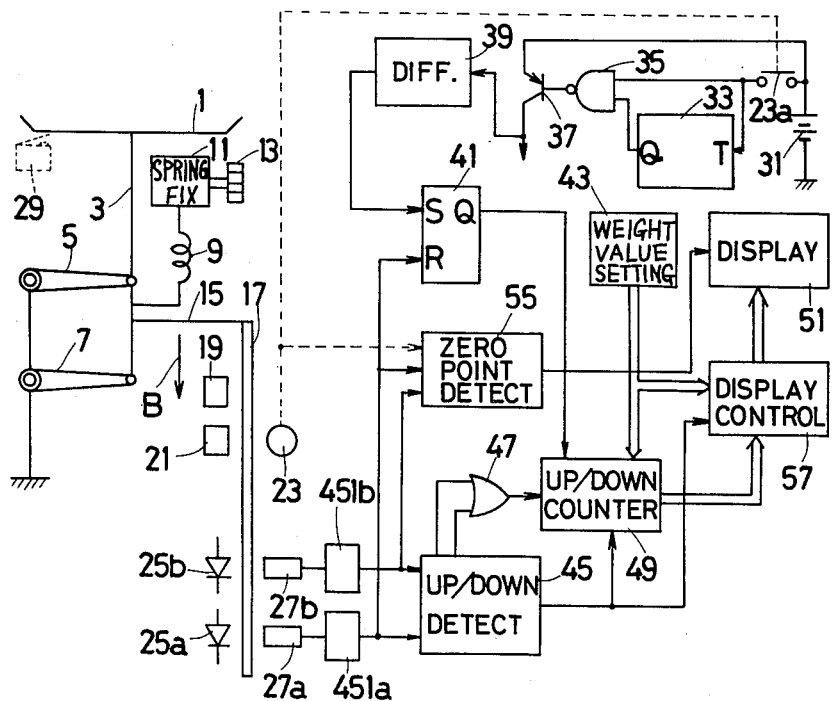
FIG. 7 is a block diagram showing an outline of another embodiment of the present invention.

FIG. 7 is a block diagram showing an outline of another embodiment of the present invention. The FIG. 7 embodiment is substantially the same as the FIG. 1 embodiment, except for the following respects. More specifically, the slit plate 17' is formed of one series of slits 171' as shown in FIG. 8. Two light emitting diodes 25a and 25b are provided at one side of the slit plate 17'. Similarly, photosensitive devices 27a and 27b are provided at the opposite side of the slit plate 17', such that the photosensitive devices 27a and 27b receive a light beam from the corresponding light emitting diodes 25a and 25b through the same slits 171' with a phase difference of 90°.

The embodiment shown further comprises a zero point detecting circuit 55 and a display control circuit 57. The zero point detecting circuit 55 will be described subsequently with reference to FIG. 10, but briefly the same receives the pulses from the pulsing circuits 451a and 451b and is operable responsive to the turning off of the reed switch 23. The display control circuit 57 will be described in detail subsequently with reference to FIG. 9, but briefly the same receives the data associated with the above described predetermined weight value from the weight value setting circuit 43, the data associated with a weight value from the up/down counter 49, and an output signal of the flip-flop 456 (FIG. 3) of the up/down detecting circuit 45 and controls a supply of the data associated with the weight value obtained from the up/down counter 49 to the display 51.

FIG. 8 shows a relative positional relation of the slit plate 17' and the associated photosensitive devices 27a and 27b. The slit 17' is, different from the FIG. 2 slit 17, formed of a zero point detecting slit 172' serving as a zero point position index. The mechanical zero point position of the slits 171' of the slit plate 17' is Q0 and no slits 171' are formed in the region H1 from the position Q0 to the position Qg corresponding to a displacement amount corresponding to the above described predetermined weight value. Furthermore, the zero point detecting slit 172' is formed in a width slightly wider than the region H4, i.e. the distance between the photosensitive devices 27a and 27b. A magnetic shield plate 173 is also formed on the slit plate 17'. The magnetic shield plate 173' is formed to extend over the regions H2' (corresponding to the region H2 in the previously described embodiment) and H5. The reed switch 23 and the associated permanent magnet 21 are positioned at the mechanical zero point position Q0' shown in FIG. 8. Accordingly, the contact 23a of the reed switch 23 is turned on by application of a magnetic field by the permanent magnet 21 for the first time when the slit plate 17' is displaced by the region H2' in the arrow B direction.

FIG. 9 is a block diagram showing in detail the display control 57. The display control 57 comprises a comparison circuit 571, an AND gate 572, and a transfer gate 573. Two inputs of the comparison circuit 571 are connected to receive the data associated with the above described predetermined weight value obtained from the circuit 43 and the data associated with a weight value obtained from the up/down counter 49. The comparison circuit 571 provides the output of the high level when both inputs coincide with each other and the output signal is applied to the AND gate 572. The inverted input of the AND gate 572 is connected to receive the output Q of the flip-flop 456 (FIG. 3) from the up/down detecting circuit 45. More specifically, the AND gate 572 provides an output if and when coincidence is detected by the comparison circuit 571 and the slit plate 17' is being displaced in the direction opposite to the arrow B direction (FIG. 8). The output of the AND gate 572 is applied to the transfer gate 573 and the transfer gate 573 inhibits transfer of the data associated with a weight value from the up/down counter 49 to the display 51 when the output of the AND gate 572 is the high level.

Figure 10:
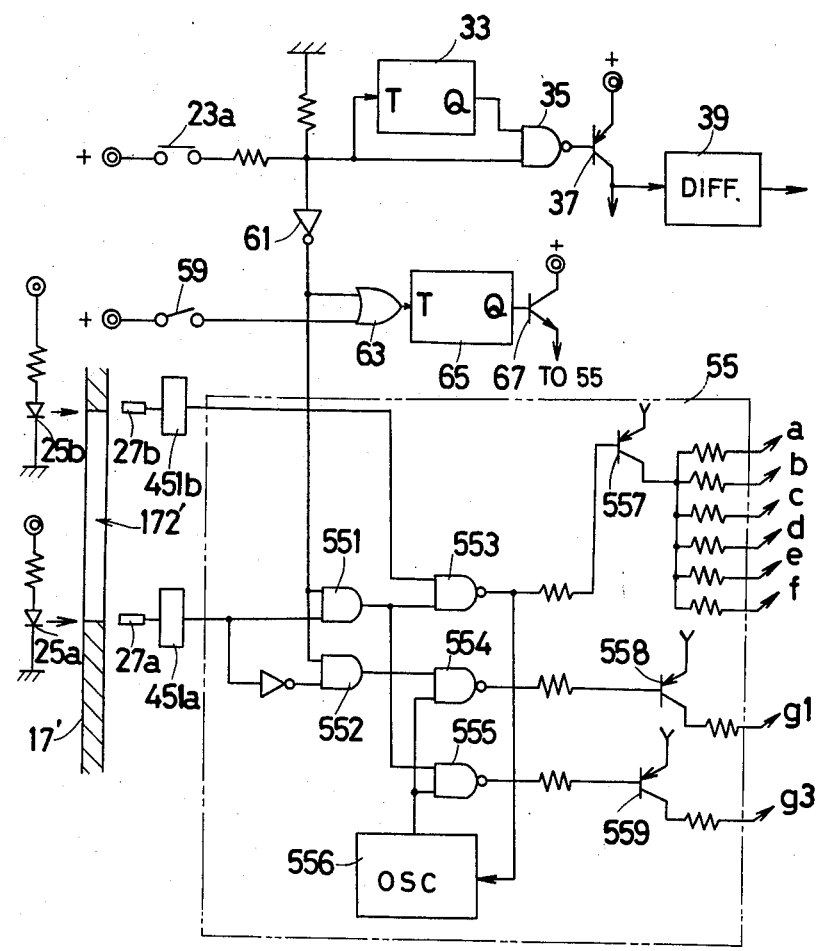
FIG. 10 is a schematic diagram showing a zero point detecting circuit and the circuit in the vicinity thereof for use in the FIG. 7 embodiment.

FIG. 10 is a schematic diagram showing in more detail mainly the zero point detecting circuit 55. The zero point detecting circuit 55 is connected to receive the pulses from the pulsing circuits 451a and 451b and a signal representative of an operation of the contact 23a of the reed switch 23. As shown, the zero point detecting circuit 55 comprises two AND gates 551 and 552, and three NAND gates 553, 554 and 555, as coupled as shown. The circuit 55 further comprises three switching transistors 557, 558 and 559, the switching transistor 557 being allotted for driving the segments a to f of the digit position of 1 of the display 51 shown in FIG. 11, the switching transistor 558 being allotted for driving the segment g1 in the digit position of 10 of the display 51, and the switching transistor 559 being allotted for driving the segment g3 in the digit position of 0.1 of the display 51. The NAND gates 554 and 555 coupled to the switching transistors 558 and 559 are connected to receive an oscillation output from an oscillator 556. The oscillator 556 is used to make a flashing indication by the segment g1 or g3.

On the other hand, the switching transistors 557, 558 and 559 of the circuit 55 are supplied with a voltage from the switching transistor 67. The collector electrode of the switching transistor 67 is connected to the positive terminal of the battery 31. The switch 59 may comprise a manually operable switch provided on the casing, not shown, which is used for manually initiating the zero point detection. The monostable multivibrator 65 is triggered responsive to the output of the OR gate 63. Two inputs of the OR gate 63 are connected to receive the signal obtained by inversion by an inverter 61 of the signal obtained when the contact 23a of the reed switch 23 is turned off, or the signal obtained when the switch 59 is operated. A preset period of time of the monostable multivibrator 65 is selected to be a period of time necessary for zero adjustment, for example. The monostable multivibrator 65 functions as a power supply control means and provides an output of the high level for a predetermined time period after the contact 23a of the reed switch 23 is turned off until the switch 59 is turned on, or a time period necessary for zero adjustment, whereupon the switching transistor 67 is rendered conductive during that period of time. Accordingly, the zero point detecting circuit 55 is supplied with a power for a period of time when the output of the monostable multivibrator 67 is kept.

Now referring to FIGS. 10 and 11, an operation of the zero point detecting circuit will be described. Assuming that no zero point deviation has occured, both the photosensitive devices 27a and 27b receive a light beam from the corresponding light emitting diodes 25a and 25b, respectively, through the zero point detecting slit 172'. Accordingly, both the pulsing circuits 451a and 451b provide the pulse outputs. Therfore, two inputs of the NAND gate 553 become the low level, whereby the switching transistor 557 is rendered conductive. Accordingly, the segments a to f of the digit position of the digit of 1 of the display 51 are supplied with a voltage.

Now assuming that the zero point is deviated in the weight increasing direction, only the photosensitive device 27b receives a light beam from the corresponding light emitting diodes 25b, while the other photosensitive device 27a does not receive a light beam by virtue of interruption by the deviated slit plate 17'. Accordingly, the output of the AND gate 552 becomes the high level and the pulse signal from the oscillator 556 is obtained at the output of the NAND gate 554. Therefore, the switching transistor 558 is controlled to be rendered conductive or non-conductive responsive to the pulse from the oscillator 556, whereby the segment g1 of the digit position of 10 of the display 51 is caused to make a flashing display. More specifically, when the segment g1 of the digit position of 10 of the display 51 makes a flashing display, this means that the zero point of the slit plate 17' has been deviated in the weight decreasing direction.

On the other hand, assuming that the zero point of the slit plate 17' has been deviated in the weight decreasing direction, then conversely to the foregoing description, only the photosensitive device 27a receives a light beam from the corresponding light emitting diode 25a. Accordingly, the switching transistor 559 is controlled to be rendered conductive or non-conductive responsive to the pulses from the oscillator 556, with the result that the segment g3 of the digit position of 0.1 of the display 51 is caused to make a flashing display. More specifically, when the segment g3 of the digit position of 0.1 of the display 51 makes a flashing display, this means that the zero point of the slit plate 17' has been deviated in the weight decreasing direction.

Thus, when the weighing apparatus is brought from a weighing operation state to a standby state, the monostable multibivrator 65 is automatically triggered, whereby the zero point detecting circuit 55 is supplied with a power supply for a preset period of time, thereby to display a zero point deviation state. As a result, an operator can learn whether the measurement just made was accurate or not. If and when the zero point has been deviated, then the zero point adjusting knob 13 may be operated to displace the spring fixing portion 11 of the spring 9, as described previously, so that mechanical zero point is adjusted.

The operation of the other circuit portions in the FIG. 7 embodiment is the same as that described in conjunction with the FIG. 1 embodiment and it is not believed necessary to describe the details thereof again.

Although the FIG. 7 embodiment was structured to make a flashing display of a specified segment in the display 51 for making a digital display of a weight value, for the purpose of displaying a zero point deviation state, alternatively a zero point deviation state may be indicated by any other display manner. Furthermore, it is needless to say the any particular display portion may be additionally provided to display such a zero point deviation state, instead of using a specified segment in the display 51.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic weighing apparatus including electric circuit components comprising:
   article placement means for placement of an article,
   displacement means operatively coupled to said article placement means for causing a displacement in association with a weight of an article placed on said article placement means and having a plurality of detectable portions arranged at predetermined intervals,
   article detecting means for detecting placement of an article being weighed on said article placement means and for generating an output, said article detecting means operatively responsive to a displacement of said displacement means,
   pulse signal generating means operatively coupled to said displacement means and responsive to said plurality of detectable portions for generating pulse signals,
   counter means responsive to the pulse signals from said pulse signal generating means for counting said pulse signals for generating data associated with the weight value of said article placed on said article placement means, and
   display means for displaying in a digital manner said data associated with the weight value of said article generated in said counter means,
   said plurality of detectable portions of said displacement means being formed to generate said pulse signals from said pulse signal generating means when a displacement of said displacement means exceeds a displacement amount corresponding to a predetermined weight value,
   predetermined weight value loading means for storing the data associated with said predetermined weight value and for preloading said data associated with said predetermined weight value into said counter means, and
   means operatively responsive to the article detecting means output for disabling said predetermined weight value loading means at least until an output is obtained from said article detecting means and for enabling said predetermined weight value loading means when an article detecting means output is obtained.

2. An electronic weighing apparatus in accordance with claim 1, wherein said article detecting means comprises
   a detectable portion formed at a predetermined portion of said displacement means, and
   detecting means for detecting a displacement of said detectable portion of said displacement means at a predetermined position.

3. An electronic weighing apparatus in accordance with claim 1, wherein said plurality of detectable portions of said displacement means are structured to be photodetectable, and said pulse signal generating means comprises photosensitive means for photoelectrically detecting said plurality of photodetectable portions.

4. An electronic weighing apparatus in accordance with claim 3, wherein said plurality of photodetectable portions of said displacement means comprise slits.

5. An electronic weighing apparatus in accordance with claim 1, wherein said displacement means is made of a non-magnetic material, and said article detecting means comprises
   a permanent magnet and a magnet sensitive switch provided to be faced to each other through said displacement means at a predetermined position, and
   a magnetic shield means formed at a portion of said displacement means.

6. An electronic weighing apparatus in accordance with claim 5, wherein said magnetic shield means is formed such that said magnet sensitive switch is operated by said permanent magnet before said plurality of detectable portions are detected by said pulse signal generating means.

7. An electronic weighing apparatus in accordance with claim 1, wherein said article detecting means comprises means for detecting a load of said article in terms of a displacement of said article placement means.

8. An electronic weighing apparatus in accordance with claim 7, wherein said article detecting means comprises a limit switch operable responsive to a displacement of said article placement means.

9. An electronic weighing apparatus in accordance with claim 1, which further comprises
power supply means for energizing electric circuit components in said electronic weighing apparatus, and wherein said article detecting means comprises
power supply controlling means responsive to detection of placement of an article being weighed for initiating a power supply from said power supply means to said electric circuit components in said pulse generating means, said counter means, and said display means.

10. An electronic weighing apparatus in accordance with claim 9, wherein said power supply controlling means is structured to terminate a power supply a predetermined period of time after initiation of a power supply to said pulse signal generating means, said counter means and said display means.

11. An electronic weighing apparatus in accordance with claim 9, wherein said power supply comprises a battery.

12. An electronic weighing apparatus in accordance with claim 1, which further comprises display control means for controlling a display timing of said display means.

13. An electronic weighing apparatus in accordance with claim 12, wherein said display control means comprises means for enabling said display means responsive to initiation of generation of the pulse signals by said pulse signal generating means.

14. An electronic weighing apparatus in accordance with claim 12, wherein said display control means comprises
compare means for comparing said data associated with said predetermined weight value and said data associated with a weight value in said counter means, and
transfer gate means responsive to a coincidence detected output from said compare means for selectively supplying said data associated with a weight value in said counter means to said display means.

15. An electronic weighing apparatus in accordance with claim 14, wherein
said pulse signal generating means comprises predetermined direction detecting means for detecting a displacement in a predetermined direction of said displacement means, and
said display control means comprises AND gate means responsive to the output of said predetermined direction detecting means and said coincidence detected output of said compare means for controlling said transfer gate.

16. An electronic weighing apparatus in accordance with claim 1, which further comprises indicating means formed on said displacement means for providing an indication concerning a mechanical zero point position of said displacement means.

17. An electronic weighing apparatus in accordance with claim 16, which further comprises
zero point deviation state detecting means for detecting deviation of said mechanical zero point position of said displacement means from said indicating means, and
zero point deviation indicating means for indicating deviation of the zero point position detected by said zero point deviation state detecting means.

18. An electronic weighing apparatus in accordance with claim 17, which further comprises enable switch means for enabling said zero point deviation state detecting means, and wherein said power supply control means is structured to initiate a power supply to said zero point deviation state detecting means for a predetermined period of time after said enable switch means is operated.

19. An electronic weighing apparatus in accordance with claim 17, which further comprises no-load detecting means for detecting a change of said article placement means to a no-load state, and wherein said power supply control means is structured to be responsive to the output of said no-load state detecting means for initiating a power supply to said zero point deviation state detecting means for a predetermined time period.

20. An electronic weighing apparatus in accordance with claim 17, which further comprises zero point adjusting means for adjusting deviation of said zero point position indicating means of said displacement means.

21. An electronic weighing apparatus in accordance with any one of claims 19 or 20, wherein said display means comprises a plurality of display digit positions, each digit display position comprising an arrangement of a plurality of segments for indicating any one of numerals through selective activation of said plurality of segments, and said zero point deviation indicating means comprises means for activating a predetermined segment among said plurality of digit display positions.

22. An electronic weighing apparatus including electric circuit components, comprising:
article placement means for placement of an article,
displacement means operatively coupled to said article placement means for causing a displacement in association with a weight of an article placed on said article placement means and having a plurality of detectable portions arranged at predetermined intervals,
pulse signal generating means operatively coupled to said displacement means and responsive to said plurality of detectable portions for generating pulse signals,
counter means responsive to the pulse signals from said pulse signal generating means for counting said pulse signals for generating data associated with the weight value of said article placed on said article placement means, and
display means for displaying in a digital manner said data associated with the weight value of said article generated in said counter means,
said plurality of detectable portions of said displacement means being formed to generate said pulse signals from said pulse signal generating means when a displacement of said displacement means exceeds a displacement amount corresponding to a predetermined weight value,
predetermined weight value loading means for storing the data associated with said predetermined weight value and for preloading said data associated with said predetermined weight value to said counter means until generation of the pulse signal by said pulse signal generating means,
indicating means formed on said displacement means for providing an indication concerning a mechanical zero point position of said displacement means, zero point deviation state detecting means for detecting deviation of said mechanical zero point position of said displacement means, and zero point deviation indicating means for indicating deviation of the zero point position detected by said zero point deviation state detecting means.

23. An electronic weighing apparatus including electric circuit components, comprising:

article placement means for placement of an article, displacement means operatively coupled to said article placement means for causing a displacement in association with a weight of an article placed on said article placement means and having a plurality of detectable portions arranged at predetermined intervals, pulse signal generating means operatively coupled to said displacement means and responsive to said plurality of detectable portions for generating pulse signals, counter means responsive to the pulse signals from said pulse signal generating means for counting said pulse signals for generating data associated with the weight value of said article placed on said article placement means, said plurality of detectable portions of said displacement means being formed to generate said pulse signals from said pulse signal generating means when a displacement of said displacement means exceeds a displacement amount corresponding to a predetermined weight value, article detecting means for detecting placement of an article being weighed on said article placement means, said article detecting means comprising magnetic coupling means operatively arranged relative to at least one of said article placement means and said displacement means, said magnetic coupling means having a nonsensitive zone corresponding to said predetermined displacement amount of said displacement means, means for storing in advance a weight value corresponding to said nonsensitive zone, means responsive to operation of said magnetic coupling means for generating true weight value data through addition of said value stored in advance and the weighed value obtained from said counter means, and means for displaying the output of said true weight value data generating means.

* * * * *